(12) United States Patent
Kusumi et al.

(10) Patent No.: US 7,180,201 B2
(45) Date of Patent: Feb. 20, 2007

(54) ENGINE STARTING APPARATUS

(75) Inventors: Hidetoshi Kusumi, Brussels (BE);
Kentarou Mitai, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/100,564

(22) Filed: Apr. 7, 2005

(65) Prior Publication Data

US 2005/0236837 A1 Oct. 27, 2005

(30) Foreign Application Priority Data

Apr. 23, 2004 (JP) ............................ 2004-128608

(51) Int. Cl.
*F02D 29/06* (2006.01)
(52) U.S. Cl. ..................... 290/40 C; 290/22; 290/23; 290/24; 290/25; 290/26; 290/27; 290/28; 290/29; 322/14; 322/16
(58) Field of Classification Search ............. 290/40 C, 290/22, 23, 24, 25, 26, 27, 28, 29; 322/14, 322/16
See application file for complete search history.

(56) References Cited

U.S. PATENT DOCUMENTS

| | | | | |
|---|---|---|---|---|
| 5,650,713 | A | * | 7/1997 | Takeuchi et al. .............. 322/16 |
| 6,018,198 | A | * | 1/2000 | Tsuzuki et al. ................ 290/17 |
| 6,093,974 | A | * | 7/2000 | Tabata et al. ............. 290/40 R |
| 6,593,713 | B2 | * | 7/2003 | Morimoto et al. ........... 318/139 |
| 6,713,888 | B2 | * | 3/2004 | Kajiura ..................... 290/40 F |
| 6,784,563 | B2 | * | 8/2004 | Nada ......................... 290/40 C |
| 6,834,632 | B2 | | 12/2004 | Kataoka et al. |
| 6,879,888 | B2 | * | 4/2005 | Ochiai et al. ................. 701/22 |
| 6,900,552 | B2 | * | 5/2005 | Fukano et al. ............ 290/40 C |

FOREIGN PATENT DOCUMENTS

| | | |
|---|---|---|
| JP | 06-062553 | 3/1994 |
| JP | 11-125136 | 5/1999 |
| WO | WO 01/48373 A1 | 7/2001 |

OTHER PUBLICATIONS

German Language Version of German Office Action for Appl. No. 102005018598.3 issued Jul. 26, 2006.
English Language Translation of German Office Action for Appl. No. 102005018598.3 issued Jul. 26, 2006.

* cited by examiner

*Primary Examiner*—Nicholas Ponomarenko
*Assistant Examiner*—Iraj A. Mohandesi
(74) *Attorney, Agent, or Firm*—Kenyon & Kenyon LLP

(57) ABSTRACT

A starting apparatus for an engine has a plurality of cylinders and an output shaft. The apparatus includes a power supply, an inverter having a switching element, a motor generator, an ECU, A crank angle sensor. The motor generator is coupled to the output shaft and connected to the power supply through the inverter. The ECU energizes the motor generator by controlling the inverter when the engine is started. The ECU causes ignition to occur in a specific cylinder that contains air-fuel mixture and is in an expansion stroke in an engine stopping state. The crank angle sensor indirectly detects a rotational speed of the motor generator. After the ignition caused, the ECU prohibits the motor generator from being energized until the rotational speed detected reaches or exceeds a predetermined value. As a result, the apparatus curbs an excessive increase in the temperature of a switching element.

20 Claims, 3 Drawing Sheets

ENGINE STARTING APPARATUS

BACKGROUND OF THE INVENTION

The present invention relates to an engine starting apparatus including an electric motor that produces auxiliary driving force used for assisting in cranking an engine.

For example, Japanese Laid-Open Patent Publication No. 6-62553 discloses such an engine starting apparatus that causes an electric generator such as an alternator to function as an electric motor, thereby assisting in cranking an engine. In this configuration, the generator motor is energized to assist in cranking the engine. When the rotation speed of the engine reaches a predetermined value, the engine starts igniting and rotating by itself. Switching between energization and stop of energization of the generator motor is generally executed by controlling an inverter having a switching element.

When a non-rotating generator motor is energized, a current (stator current), which is represented by the following equation (1), flows through the stator of the generator motor.

$$\text{Stator current} = \text{power supply voltage}/(\text{stator resistance} + \text{wiring resistance}) \quad (1)$$

The wiring resistance in the equation (1) refers to the resistance of parts between the power supply and the generator motor other than the stator.

In the switching element, collector dissipation that is in proportion to the squared stator current is produced. The collector dissipation generates Joule heat, which increases the temperature of the switching element. On the other hand, the rotational speed and the current characteristics have the following relationship in the generator motor. That is, the stator current is large when the rotational speed is low and is decreased as the rotation speed is increased. Thus, when starting the non-operating engine, if the rotational speed of the generator motor is low, a large stator current is generated, which significantly increases the temperature of the switching element.

If such a state continues in which a large stator current flows during starting of the engine in a case where a general-purpose switching element having a relatively low heat resistance is used, the temperature of the element can exceed the rated temperature of the element. This state may occur, for example, when the engine friction is great and the generator motor does not rotate (locked) during starting of the engine. In general, energization stopping function is activated in which energization of the generator motor is stopped if the generator motor does not start operating for a predetermined period (for example, several tens of milliseconds) from the start of energization. This function is referred to as a lock protection function. Until the function is activated, a large stator current continues flowing.

To avoid such drawbacks, switching elements of a low on resistance or an increased thermal capacity have been proposed. A low on resistance switching element is configured to reduce the internal resistance so as to permit a large current to pass through. An increased thermal capacity switching element withstands a high temperature.

However, since low on resistance switching elements and increased thermal capacity switching elements are newly developed and thus costly, the cost of engine starting apparatus is significantly increased. Therefore, there is a demand for an engine starting apparatus that eliminates the above described drawbacks without using such expensive switching elements.

SUMMARY OF THE INVENTION

Accordingly, it is an objective of the present invention to provide an engine starting apparatus that curbs an excessive increase in the temperature of a switching element when a large current passes through the switching element.

To achieve the foregoing and other objectives and in accordance with the purpose of the present invention, a starting apparatus for an engine having a plurality of cylinders and an output shaft is provided. The apparatus includes a power supply, an inverter having a switching element, a motor generator, an energization controlling section, an ignition section, a rotational speed detecting section, and an energization prohibiting section. The motor generator is coupled to the output shaft and connected to the power supply through the inverter. The energization controlling section energizes the motor generator by controlling the inverter when the engine is started. The ignition section causes ignition to occur in a specific cylinder that contains air-fuel mixture and is in an expansion stroke in an engine stopping state, thereby rotating the output shaft. The rotational speed detecting section directly or indirectly detects a rotational speed of the motor generator. After the ignition caused by the ignition section, the energization prohibiting section prohibits the energization controlling section from energizing the motor generator until the rotational speed detected by the rotational speed detecting section reaches or exceeds a predetermined value.

The present invention also provides an engine system including an engine having a plurality of cylinders and an output shaft, a power supply, an inverter having a switching element, a motor generator that is coupled to the output shaft and connected to the power supply through the inverter, a device that directly or indirectly detects a rotational speed of the motor generator, and a controller. When starting the engine, the controller causes ignition to occur in a specific cylinder that contains air-fuel mixture and is in an expansion stroke in an engine stopping state. The controller energizes the motor generator by controlling the inverter when the rotational speed detected by the device reaches or exceeds a predetermined value after the ignition.

Further, the present invention provides a starting method for an engine, an output shaft of which is coupled to a motor generator. The motor generator is connected to a power supply through an inverter having a switching element. The method includes: causing ignition to occur in a specific cylinder that contains air-fuel mixture and is in an expansion stroke in an engine stopping state, thereby rotating the output shaft; and energizing the motor generator by controlling the inverter when the rotational speed of the motor generator reaches or exceeds a predetermined value after the ignition.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

FIRST EMBODIMENT

An engine starting apparatus according to a first embodiment of the present invention will now be described with reference to FIGS. 1 to 4.

Figure 1:
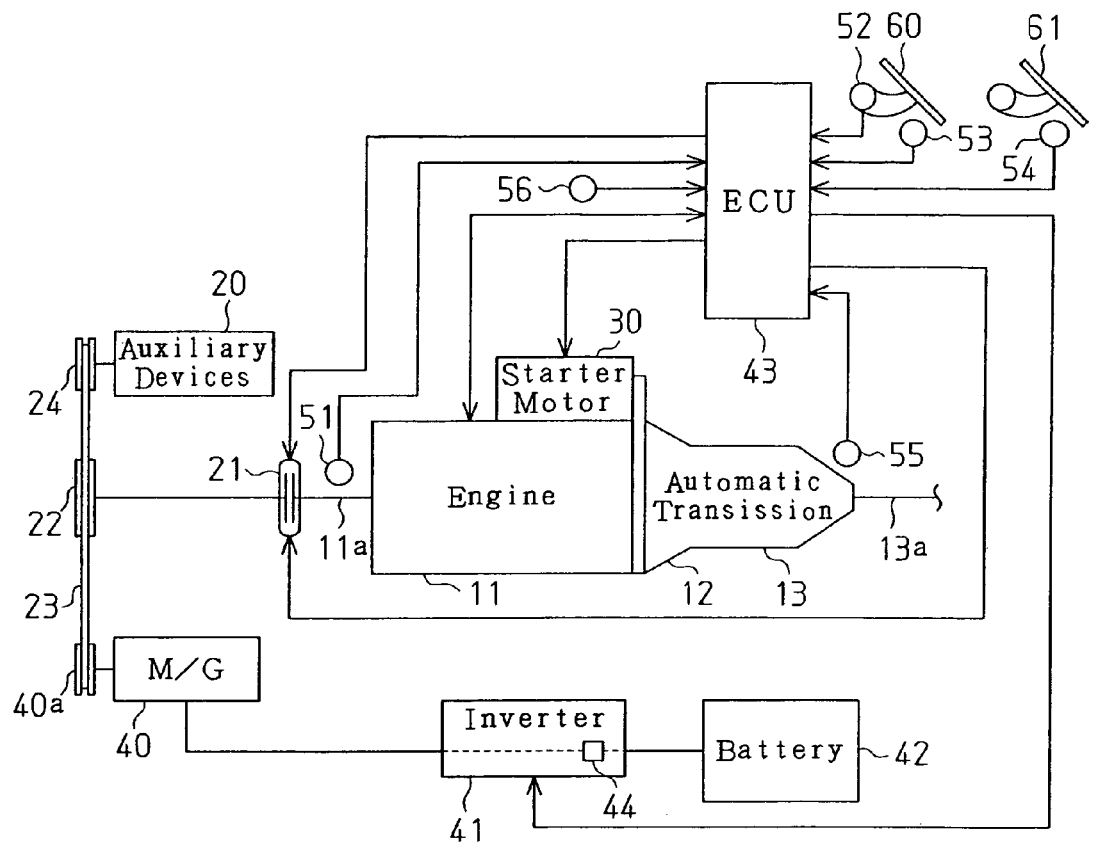
FIG. 1 is a diagrammatic view showing an overall configuration of a first embodiment according to the present invention.

FIG. 1 is a diagrammatic view showing the engine starting apparatus, an engine 11 to which the apparatus is applied, and its surroundings. First, the engine 11 and its surroundings will be described.

The engine 11 is coupled to an automatic transmission 13 with a torque converter 12. Power of the engine 11 is transmitted to drive wheels (not shown) through a crankshaft 11a, the torque converter 12, and an output shaft 13a of the automatic transmission 13.

The engine 11 is also coupled to various auxiliary devices 20, such as a compressor for air conditioning, a power steering pump, and a water pump for cooling the engine 11. Power of the engine 11 is also transmitted to a belt 23 through an electromagnetic clutch 21 coupled to the crankshaft 11a, and an engine pulley 22. As the belt 23 rotates, an auxiliary device pulley 24 coupled to the auxiliary devices 20 is rotated. The auxiliary devices driving system may include gears and chains instead of the pulleys 22, 24 and the belt 23. The crankshaft 11a is selectively connected and disconnected with the auxiliary devices driving system as the electromagnetic clutch 21 is engaged and disengaged.

Further, the engine 11 is coupled to a starter motor 30 for cranking the engine 11.

The engine starting apparatus includes a motor generator (hereinafter referred to as M/G) 40, an inverter 41, a battery 42, and an electronic control unit (ECU) 43. The M/G 40 functions as a generator and a motor. The inverter 41 switches the function of the M/G 40. The battery 42 supplies electricity to the M/G 40. The ECU 43 controls the operation of the M/G 40.

An M/G pulley 40a is coupled to a rotary shaft of the M/G 40, and the belt 23 is engaged with the M/G pulley 40a. The characteristics such as diameters of the M/G pulley 40a and the engine pulley 22 are determined such that the rotary shaft of the M/G 40 rotates, for example, at double the rate of the crankshaft 11a. When receiving electricity from the battery 42, the M/G 40 functions as a motor and supplies rotational torque to the engine 11 (the crankshaft 11a) and the auxiliary devices 20. When driven by rotational torque applied by the engine 11, the M/G 40 functions as a generator. That is, the M/G 40 converts the applied rotational torque into electricity and charges the battery 42 with it. When the M/G 40 that is not rotating is energized for cranking, a stator current represented by the above equation (1) flows through the stator of the M/G 40.

The inverter 41 includes a switching element 44. The switching element 44 switches the M/G 40 between the generator function and the motor function. In this embodiment, an inexpensive insulated-gate field-effect transistor (MOS-FET) that has a relatively low thermal capacity is used as the switching element 44. In general, collector dissipation that is in proportion to the squared stator current is produced in the switching element 44. The collector dissipation generates Joule heat, which increases the temperature of the switching element 44.

The ECU 43 is connected to various sensors for detecting the state of the engine 11 and the vehicle, and various switches. The ECU 43 receives detection signals from the sensors and the switches. The sensors and switches include, for example, the followings.

A crank angle sensor 51 for detecting rotational angle of the crank shaft 11a

An accelerator pedal sensor 52 for detecting the degree of depression of an accelerator pedal 60

An accelerator pedal switch 53 for detecting the state where the accelerator pedal is depressed A brake pedal switch 54 for detecting that a brake pedal 61 pedal is depressed A shift position sensor 55 for detecting the shift position of the automatic transmission 13

A vehicle speed sensor 56 for detecting the vehicle speed

The rotational angle of the crankshaft 11a detected by the crank angle sensor 51 is used for computing the engine rotational speed, which is a number of rotation of the crankshaft 11a per unit time.

Further, the ECU 43 is connected and outputs actuation signals to the inverter 41, the starter motor 30, the electromagnetic clutch 21, injectors for injecting fuel into cylinders of the engine 11, and ignition plugs for igniting air fuel mixture in the cylinders. Based on detection results of the sensors 51, 52, 55, 56 and the switches 53, 54, the ECU 43 executes various controls related to the operation of the engine 11 and the driving of the vehicle. For example, the ECU 43 executes an automatic stopping process and an automatic starting process of the engine 11.

In this embodiment, the ECU 43 executes a cranking stop position control for controlling the stop position of the crankshaft 11a of the engine 11 together with the automatic stopping process.

In the automatic starting process, the ECU 43 executes an expansion stroke ignition process and energizes the M/G 40. Through the expansion stroke ignition process, the crankshaft 11a is rotated, and the torque of the thus rotated crankshaft 11a is applied to the M/G 40. The automatic stopping process is executed, for example, when all of the following conditions for automatic stopping are met.

The accelerator pedal 60 is not depressed.

The vehicle is not moving.

The rotational speed of the engine 11 is equal to or less than a predetermined speed.

The charge level of the battery 42 is equal to or greater than a predetermined level.

A brake pedal 61 is depressed, or the shift lever of the automatic transmission 13 is in parking or neutral.

These automatic stopping conditions may be replaced by other conditions. Alternatively, other conditions may be added.

The cranking stop position control refers to a control in which the crankshaft 11a is stopped at a target stop position when the engine 11 is stopped through the automatic stopping process. The target stop position is a rotational angle of the crankshaft 11a that reduces the friction in the next automatic starting of the engine 11. In the cranking stop position control, ignition is not carried out. Instead, the M/G 40 assists the rotation of the engine 11 so that the crankshaft 11a is stopped at the target stop position. Instead of using the M/G 40, another motor may be provided to apply power to the crankshaft 11a so that the motor assists the engine 11 so that the crankshaft 11a is stopped at the target stop position.

Figure 2:
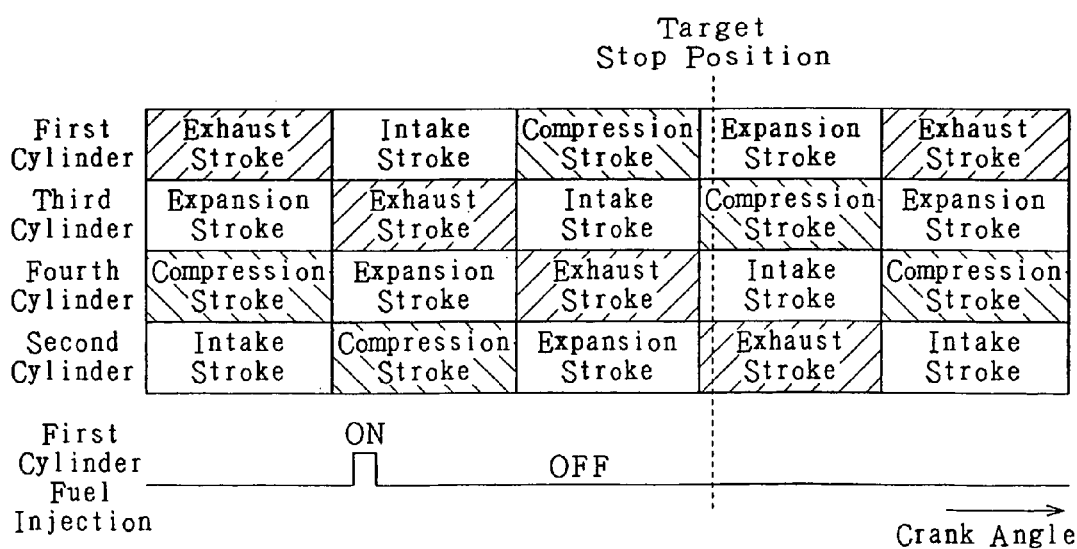
FIG. 2 is a timing chart showing the timing of fuel injection related to a cranking stop position control of the embodiment of FIG. 1.

As shown in FIG. 2, in the cranking stop position control, fuel is injected into a cylinder (first cylinder in this example) that is in the expansion stroke, where the piston moves downward, when the engine 11 is stopped in preparation for the expansion stroke ignition in the next automatic starting.

Figure 3:
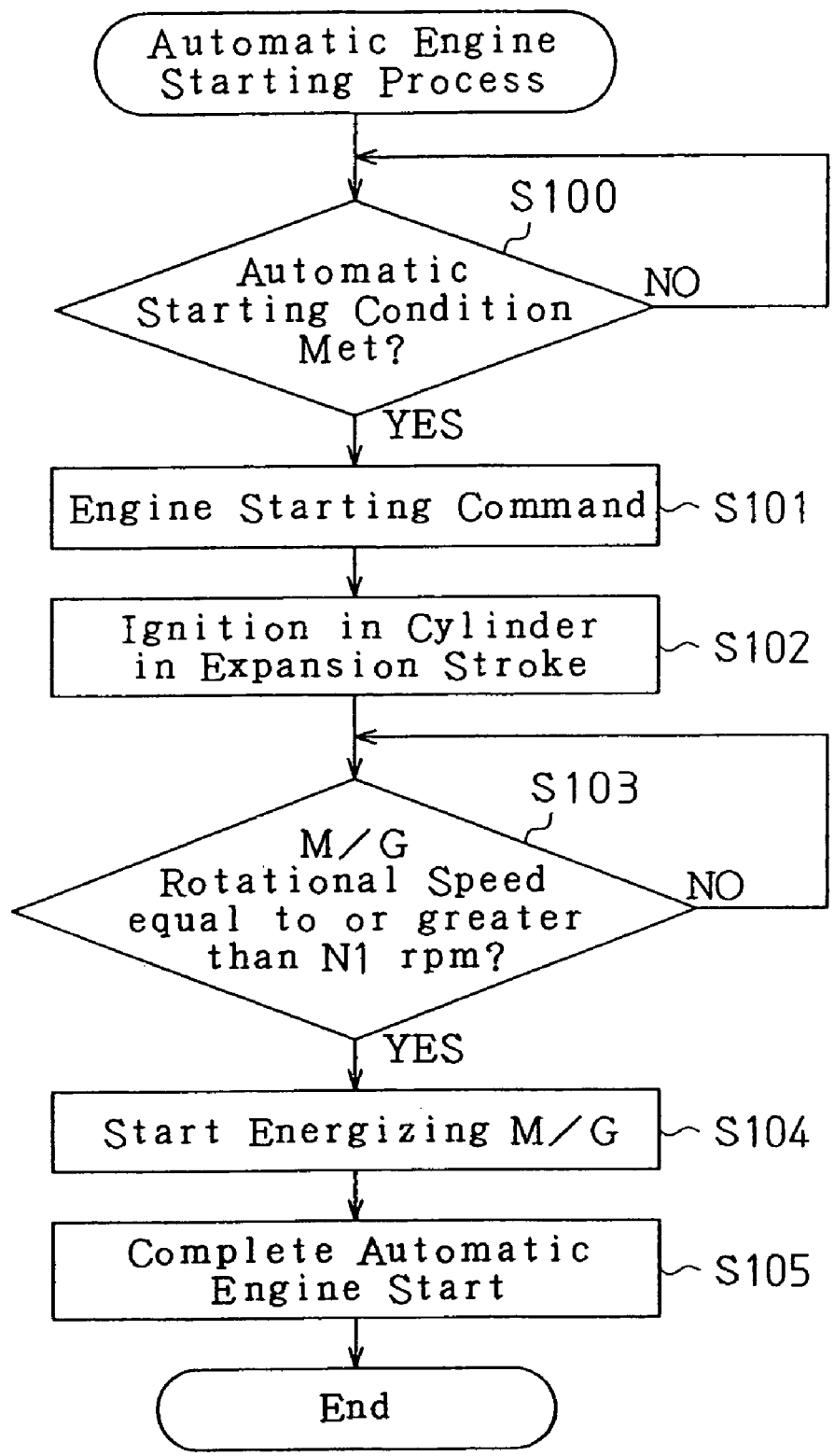
FIG. 3 is a flowchart showing an automatic engine starting process of the embodiment of FIG. 1.

An example of a series of processes in the automatic starting process of the engine 11 will now be described with reference to the flowchart of FIG. 3. The series of processes shown in the flowchart is executed on the condition that the engine 11 has been stopped by the automatic stopping process.

In the series of the processes, whether an automatic starting condition is met is determined (step 100). The automatic starting condition is determined to be satisfied, for example, when any of the following conditions is met.

The brake pedal 61 is released and the accelerator pedal 60 is depressed when the shift lever of the automatic transmission 13 is in drive (starting of the vehicle).

The brake pedal 61 is released and the released state has lasted for a predetermined period while the shift lever is in drive.

A predetermined period has elapsed since the shift lever is switched from parking or neutral to another shift position.

The vehicle is moving at a speed equal to or greater than a predetermined speed.

These automatic starting conditions may be replaced by other conditions. Alternatively, other conditions may be added.

When the automatic starting condition is not met (NO at step 100), step 100 is repeated until the automatic starting condition is met. In this case, that is, when the engine 11 is stopped, the crankshaft 11a and the M/G 40 are also stopped. Also, in a specific cylinder of the engine 11, the piston is stopped during downward stroke, or the expansion stroke. In the cylinder, due to the cranking stop position control in the previous stopping of the engine, mixture of air and fuel that was injected immediately before the crankshaft 11a was stopped exists without being burned. When the condition is met (YES at step 100) in such an engine stopping state, the ECU 43 sends engine starting commands to portions that operate to start the engine 11 (step 101).

In this example, in order to execute the expansion stroke ignition process, the ECU 43 outputs an actuation signal to an ignition plug of a cylinder where the air-fuel mixture remains, that is, the cylinder that is in the expansion stroke. Accordingly, the ignition plug of the cylinder in the expansion stroke is activated (step 102), which burns the air-fuel mixture in the cylinder and pushes down the piston. This rotates the crankshaft 11a at a super low speed. The rotational torque of the crankshaft 11a is transmitted to the M/G 40 through the belt 23, the pulleys 22, 40a to rotate the rotary shaft of the M/G 40. Accordingly, the rotational speed of the crankshaft 11a and the M/G 40 is increased.

After the M/G 40 starts rotating through the expansion stroke ignition process, whether the rotational speed N of the M/G 40 is equal to or greater than a predetermined value N1 (for example, 650 rpm) is determined (step 103). The rotational speed N is obtained by doubling the rotational speed of the crankshaft 11a (the engine rotational speed) detected by the crank angle sensor 51.

If the rotational speed N is less than the predetermined value N1, step 103 is repeated. In this case, the M/G 40 is not energized. In contrast, if the rotational speed N is equal to or more than the predetermined value N1 (YES at step 103), the inverter 41 is controlled to energize the M/G 40. In this manner, energization of the M/G 40 is prohibited until the rotational speed N reaches the predetermined value N1.

The predetermined value N1, which is a threshold value for determining whether to energize the M/G 40, is obtained in the following manner.

The following three items are among the factors that affect the temperature increase of the switching element 44 when the switching element 44 is energized.

(i) The ambient temperature of the switching element 44: ambient temperature Ta;

(ii) The amount of temperature increase of the switching element 44 due to generation of electricity by the M/G 40: generation caused temperature increase amount Tg; and (iii) The amount of temperature increase of the switching element 44 due to the automatic starting of the engine 11: starting caused temperature increase amount Tm.

If the temperature of the switching element 44 after energization of the M/G 40 is represented by T, the temperature T is expressed by the following equation (2) when the M/G 40 is energized in a state where the temperature of the switching element 44 has been increased by the generation of electricity of the M/G 40.

$$T = Ta + Tg + Tm \quad (2)$$

The design highest temperature in a temperature range in which the switching element 44 is capable of exerting a predetermined performance is represented by a rated temperature Tspec. The highest values of the ambient temperature Ta, the generation caused temperature increase amount Tg, the starting caused temperature increase amount Tm are represented by Tamax, Tgmax, and Tmmax, respectively. In this example, the maximum values Tamax and Tgmax are assumed to be substantially constant, and actually measured values are used.

In this case, the following equation (3) must be satisfied in order that the switching 44 exerts the design performance.

$$Tspec \geq Tamax + Tgmax + Tmmax \quad (3)$$

The permitted temperature increase amount of the switching element 44 when the engine 11 is started has to satisfy the following equation (4), which is obtained by modifying the equation (3).

$$Tspec - Tamax - Tgmax \geq Tmmax \quad (4)$$

Therefore, for example, if Tspec=150 [° C.], Tamax=90 [° C.], and Tgmax=49[° C.], (the M/G 40 has a generation capacity of 80A at 5000 rpm), the permitted temperature increase amount of the switching element 44 when the engine 11 is started (starting caused temperature increase amount Tm) is 11° C. at most.

On the other hand, the rotational speed and the current characteristics of the M/G 40 have the following relationship. That is, a current flowing through the stator of the M/G 40 (the stator current) is large when the rotational speed N is low and is decreased as the rotation speed N is increased. This phenomena is ascribed to the fact that a counter electromotive force is generated in the stator and the potential difference between the stator and the power supply is reduced, and as a result, the numerator of the right side of the equation (1) is reduced.

In the switching element 44, collector dissipation that is in proportion to the squared stator current is produced. The collector dissipation increases the temperature of the switching element 44. Therefore, since the stator current is reduced as the rotational speed of the M/G 40 is increased, the collector dissipation is reduced. As a result, as shown in FIG. 4, the maximum value Tmmax of the starting caused temperature increase amount of the switching element 44 is increased as the rotational speed N of the M/G 40 is decreased, and is decreased as the rotational speed N is increased.

Figure 4:
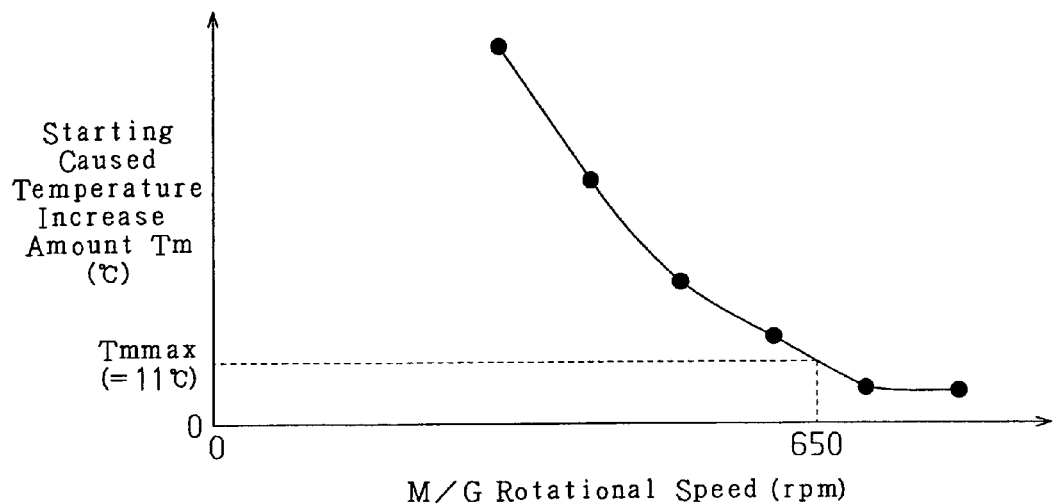
FIG. 4 is a graph showing the relationship between the rotational speed of an M/G and a starting caused temperature increase amount Tm.

According to FIG. 4, the rotation speed N of the M/G 40 when the maximum value Tmmax is 11° C. is 650 rpm. Therefore, if the M/G 40 is energized when the rotational speed of the M/G 40 is equal to or greater than 650 rpm, the starting caused temperature increase amount Tm does not exceed 11° C. That is, during the automatic starting of the engine 11, if the M/G 40 is energized when the rotational speed of the M/G 40 is equal to or greater than 650 rpm, the temperature of the switching element 44 after the energization will be within the range of the rated temperature Tspec (150° C.).

When the M/G 40 starts being energized at step 104, the M/G 40 functions as a motor. Power of the M/G 40 is transmitted to the crankshaft 11a through the belt 23 and the pulleys 40a, 22, thereby assisting the cranking of the engine 11. Thereafter, when the rotational speed of the engine 11 increases, the engine 11 becomes capable of operating in a self-contained manner. At this time, energization of the M/G 40 is stopped, and the automatic starting control of the engine 11 is completed (step 105). At step 105, the series of processes related to the automatic starting process of the engine 11 is ended. The series of the processes is repeatedly executed until the driver stops the engine 11, for example, until the driver turns off the ignition switch of the vehicle.

In the engine automatic starting process executed by the ECU 43, step 104 corresponds to a process executed by an energization controlling section. Steps 103 (repetition of step 103 as long as the outcome is NO) corresponds to a process executed by an energization prohibiting section. Step 102 corresponds to a process executed by an expansion stroke ignition section. The crank angle sensor 51 corresponds to a rotational speed detecting section that indirectly detects the rotational speed N of the M/G 40.

The engine starting apparatus according to the first embodiment has the following advantages.

(1) The engine starting command is generated when the automatic starting condition is met. In response to the engine starting command, ignition is performed in a cylinder in which the piston was stopped during the expansion stroke with air-fuel mixture generated therein when the engine was stopped last time. Accordingly, the piston is moved downward so that the crankshaft 11a is rotated (step 102). This prevents the M/G from being locked against rotation even if the engine friction is great when starting the engine 11.

(2) Energization of the M/G 40 is prohibited until the rotational speed N of the M/G 40 reaches or exceeds the predetermined value N1 after the ignition is started (NO at step 103).

Therefore, although in general energization of the M/G 40 while the rotational speed N is low causes a large stator current in the stator and significantly increases the temperature of the switching element 44, the energization prohibiting process prevents such temperature increase at the switching element 44 due to a stator current.

Then, when the rotational speed N of the M/G 40 reaches the predetermined value N1, the energization is permitted, so that the inverter 41 is controlled to energize the M/G 40. Accordingly, the M/G 40 is rotated to assist in cranking the engine 11.

Thus, the switching element 44 is prevented from being excessively heated by a large current. Therefore, a conventional inexpensive switching element can be used. In other words, no special switching element is needed. This reduces the costs.

(3) The predetermined value N1 related to the rotational speed N of the M/G 40 is determined to correspond to the maximum value of the permitted temperature increase amount of the switching element 44 when the engine 11 is started. A value that satisfies the conditions is set as the predetermined value N1, which is used as a threshold value for determining whether to permit energization. This configuration prevents the temperature of the switching element 44 from exceeding the maximum value Tmmax of the permitted temperature increase amount when the engine 11 is started.

(4) The maximum value Tmmax of the temperature increase amount in the item (3), which is used when starting the engine 11, is computed by subtracting the maximum value Tamax of the ambient temperature and the maximum value Tgmax of the temperature increase due to generation of electricity from the rated temperature Tspec of the switching element 44. A value of the rotational speed N that corresponds to the maximum value Tmmax thus obtained is set as the predetermined value N1. This ensures the advantage of the item (1).

(5) Since the rotational speed of the crankshaft 11a and the rotational speed N of the M/G 40 have a one-to-one correlation, the rotational speed N of the M/G is obtained based on the rotational speed of the crankshaft 11a detected by the crank angle sensor 51, and the obtained rotational speed N is used to determine whether to energize the M/G 40. Therefore, no sensor for directly detecting the rotational speed of the M/G is required, which reduces the number of the components.

(6) The maximum value Tamax of the ambient temperature Ta, and the maximum value Tgmax of the generation temperature incrase amount Tg are both actually measured values. The maximum values Tamax and Tgmax are used for obtaining the maximum value Tmmax of the permitted temperature increase amount for the switching element 44 when the engine 11 is started. Therefore, no sensors for detecting the ambient temperature Ta and the generation caused temperature increase amount Tg need to be provided.

SECOND EMBODIMENT

A second embodiment according to the present invention will now be described. The differences from the first embodiment will be mainly discussed.

In the first embodiment, the M/G 40 is rotated in the expansion stroke ignition process and the energization process to automatically start the engine 11. However, in a case where the friction in the engine 11 is great, there is a possibility that the engine 11 cannot operate in a self-contained manner and the rotational speed N drops even if the rotational speed N of the M/G 40 becomes temporarily equal to or more than the predetermined value N1 immediately after the expansion stroke ignition process. In such a case, after the M/G 40 is energized, a current through the switching element 44 is increased as the rotational speed of the M/G 40 (crankshaft 11a) is decreased. Accordingly, the temperature of the switching element 44 is increased. Thus, in the second embodiment, to eliminate such a drawback, energization of the M/G 40 is forcibly stopped when it is determined that the engine 11 is not capable of operating in a self-contained manner even after the M/g 40 is energized.

Hereinafter, an example of a process for forcibly stopping energization of the M/G 40 will be described with reference to FIG. 5. The process is part of the automatic starting process of the engine 11 and is executed after the M/G 40 is energized (step 104 of FIG. 3).

Figure 5:
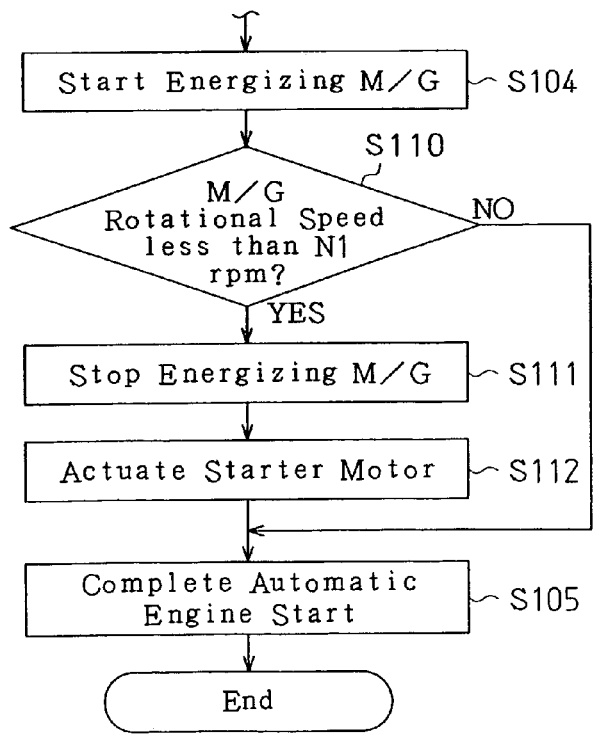
FIG. 5 is a flowchart showing a part of an automatic engine starting process according to a second embodiment.

As shown in FIG. 5, when the M/G 40 starts being energized (step 104), it is determined whether the rotational speed N of the M/G 40 is less than the predetermined value N1 (step 110). That is, it is determined at step 110 whether the engine 11 is capable of operating in a self-contained manner. The determination of step 110 is repeatedly performed until a predetermined period elapsed since when the M/G 40 starts being energized. The predetermined period corresponds to a period from when the M/G 40 starts being energized to when the engine 11 becomes capable of operating in a self-contained manner. If the rotational speed N of the M/G 40 does not fall below the predetermined value N1 until the predetermined period elapses at step 110 (NO at step 110), the engine 11 is assumed to be operating in a self-contained manner. Therefore, the automatic starting of the engine 11 is completed (step 105), and the series of processes is ended.

On the other hand, if the rotational speed N of the M/G 40 is determined to have fallen below the predetermined value N1 before the predetermined period elapses at step 110 (YES at step 110), the engine 11 is not assumed to be operating in a self-contained manner. Therefore, energization of the M/G 40 is forcibly stopped (step 111). Also, substantially at the same time as the energization is stopped, electricity is supplied to the starter motor 30 (step 112). This actuates the starter motor 30, which in turn starts cranking the engine 11.

Thereafter, when the rotational speed of the engine 11 increases, the engine 11 becomes capable of operating in a self-contained manner. At this time, energization of the starter motor 30 is stopped, and the automatic starting control of the engine 11 is completed (step 105). At step 105, the series of processes related to the automatic starting process of the engine 11 is ended.

Steps 110 and 111 during the automatic starting process executed by the ECU 43 correspond to a process executed by an energization stopping section.

In addition to the advantages listed in items (1) to (6) in the first embodiment, the engine starting apparatus according to the second embodiment provides the following advantages.

(7) Energization of the M/G 40 is forcibly stopped when the rotational speed N of the M/G 40 falls below the predetermined value N1 after the M/G 40 starts being energized (steps 110 and 111). Therefore, in a case where energization has been started because the rotation speed N once reaches the predetermined value N1, but the rotational speed N falls below the predetermined value N1 for some reason, the switching element 44 is prevented from being excessively heated by a large current. In this respect, the second embodiment ensures the reduction of the costs by eliminating the need of a special switching device.

(8) After energization of the M/G 40 is forcibly stopped, the engine 11 is cranked by the starter motor 30 (step 112). Therefore, if the engine 11 is cannot be started by rotational torque of the M/G 40, the engine 11 is readily started.

OTHER EMBODIMENTS

The above embodiments may be modified as follows.

In the above embodiments, a temperature sensor may be provided for detecting the ambient temperature in the vicinity of the switching element 44, for example, the outside temperature or the coolant temperature (when the inverter 41 is a water-cooled type). In this case, during the automatic starting control of the engine 11, the temperature detected by the added temperature sensor is used as the ambient temperature Ta. The predetermined temperature N1 is computed each time the ambient temperature Ta is detected. Likewise, a temperature sensor may be provided for detecting the temperature of the switching element 44. In this case, the generation caused temperature increase amount Tg is detected by the added temperature sensor to compute the predetermined value N1. Accordingly, the range of the predetermined value N1 is expanded to a relatively lower value.

In the illustrated embodiments, a sensor may be provided for directly detecting the rotational speed N of the M/G 40. In this case, the determination of at least one of steps 103 and 110 is executed based on the detection value of the added sensor.

The M/G 40 rotates at double the rate of the crankshaft 11a. Therefore, step 103 of FIG. 3 may be changed to determine whether the engine rotational speed is equal to or more than N½ [rpm]. Likewise, step 110 of FIG. 5 may be changed to determine whether the engine rotational speed is less than N½ [rpm].

Therefore, the present examples and embodiments are to be considered as illustrative and not restrictive and the invention is not to be limited to the details given herein, but may be modified within the scope and equivalence of the appended claims.

The invention claimed is:

1. A starting apparatus for an engine having a plurality of cylinders and an output shaft, the apparatus comprising:
   a power supply;
   an inverter having a switching element;
   a motor generator that is coupled to the output shaft and connected to the power supply through the inverter;
   an energization controlling section that energizes the motor generator by controlling the inverter when the engine is started;
   an ignition section, wherein, the ignition section causes ignition to occur in a specific cylinder that contains air-fuel mixture and is in an expansion stroke in an engine stopping state, thereby rotating the output shaft;
   a rotational speed detecting section that directly or indirectly detects a rotational speed of the motor generator; and
   an energization prohibiting section, wherein, after the ignition caused by the ignition section, the energization prohibiting section prohibits the energization controlling section from energizing the motor generator until the rotational speed detected by the rotational speed detecting section reaches or exceeds a predetermined value.

2. The apparatus according to claim 1, wherein the predetermined value is set to a maximum value of the amount of permitted temperature increase of the switching element caused by energization of the motor generator when starting the engine.

3. The apparatus according to claim 2, wherein the maximum value is computed by subtracting a maximum value of an ambient temperature of the switching element and a maximum value of a temperature increase of the switching element due to generation of electricity by the motor generator from a rated temperature of the switching element.

4. The apparatus according to claim 1, further comprising an energization stopping section, wherein, after the energization controlling section starts energizing the motor generator, the energization stopping section causes the energization controlling section to stop energizing the motor generator when the rotational speed detected by the rotational speed detecting section falls below the predetermined value.

5. The apparatus according to claim 4, further comprising a starter motor coupled to the output shaft of the engine, wherein the starter motor is actuated when the energization stopping section stops energizing the motor generator.

6. The apparatus according to claim 1, wherein the engine is automatically stopped when a predetermined automatic stopping condition is met, and wherein, when a predetermined automatic starting condition is met after the engine is automatically stopped, the ignition section causes ignition to occur in the specific cylinder.

7. The apparatus according to claim 6, wherein, when the engine is automatically stopped, fuel is supplied to the specific cylinder that is in an expansion stroke in an engine stopping state.

8. An engine system comprising:
   an engine having a plurality of cylinders and an output shaft;
   a power supply;
   an inverter having a switching element;
   a motor generator that is coupled to the output shaft and connected to the power supply through the inverter;
   a device that directly or indirectly detects a rotational speed of the motor generator; and
   a controller that energizes the motor generator by controlling the inverter when starting the engine, wherein the controller causes ignition to occur in a specific cylinder that contains air-fuel mixture and is in an expansion stroke in an engine stopping state, thereby rotating the output shaft, and wherein the controller prohibits energizing the motor generator until the rotational speed detected by the device reaches or exceeds a predetermined value after the ignition.

9. The engine system according to claim 8, wherein the predetermined value is set to a maximum value of the amount of permitted temperature increase of the switching element caused by energization of the motor generator when starting the engine.

10. The engine system according to claim 9, wherein the maximum value is computed by subtracting a maximum value of an ambient temperature of the switching element and a maximum value of a temperature increase of the switching element due to generation of electricity by the motor generator from a rated temperature of the switching element.

11. The engine system according to claim 8, wherein, after starting energizing the motor generator, the controller stops energizing the motor generator when the rotational speed detected by the device falls below the predetermined value.

12. The engine system according to claim 11, further comprising a starter motor coupled to the output shaft of the engine, wherein the starter motor is actuated when the controller stops energizing the motor generator.

13. The engine system according to claim 8, wherein the engine is automatically stopped when a predetermined automatic stopping condition is met, and wherein, when a predetermined automatic starting condition is met after the engine is automatically stopped, the controller causes ignition to occur in the specific cylinder.

14. The engine system according to claim 13, wherein, when the engine is automatically stopped, fuel is supplied to the specific cylinder that is in an expansion stroke in an engine stopping state.

15. A starting method for an engine having a plurality of cylinders and an output shaft, wherein the output shaft is coupled to a motor generator, and wherein the motor generator is connected to a power supply through an inverter having a switching element, the method comprising:
   energizing the motor generator by controlling the inverter when the engine is started;
   causing ignition to occur in a specific cylinder that contains air-fuel mixture and is in an expansion stroke in an engine stopping state, thereby rotating the output shaft;
   detecting a rotational speed of the motor generator directly or indirectly; and
   prohibiting energizing the motor generator until the detected rotational speed reaches or exceeds a predetermined value after the ignition.

16. The method according to claim 15, wherein the predetermined value is set to a maximum value of the amount of permitted temperature increase of the switching element caused by energization of the motor generator when starting the engine.

17. The method according to claim 16, wherein the maximum value is computed by subtracting a maximum value of an ambient temperature of the switching element and a maximum value of a temperature increase of the switching element due to generation of electricity by the motor generator from a rated temperature of the switching element.

18. The method according to claim 15, further comprising stopping energization of the motor generator when the rotational speed of the motor generator falls below the predetermined value after the motor generator starts being energized.

19. The method according to claim 18, further comprising rotating the output shaft by a starter motor when energization of the motor generator is stopped.

20. The method according to claim 15, further comprising:
   automatically stopping the engine when a predetermined automatic stopping condition is met; and
   causing ignition to occur in the specific cylinder when a predetermined automatic starting condition is met after the engine is automatically stopped.

* * * * *